March 4, 1941.  R. B. BOURNE  2,233,804
FLUID SILENCER
Filed July 18, 1938  2 Sheets-Sheet 2
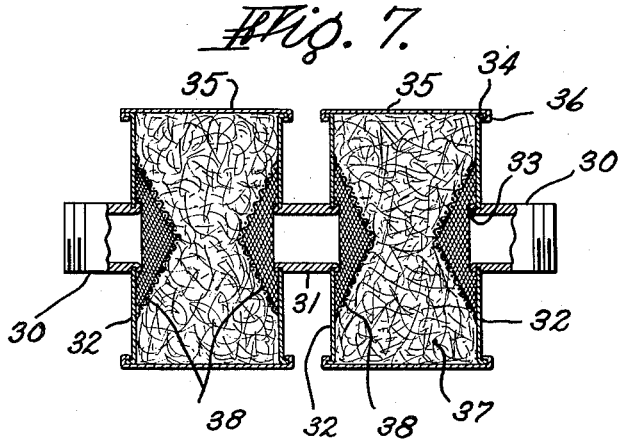
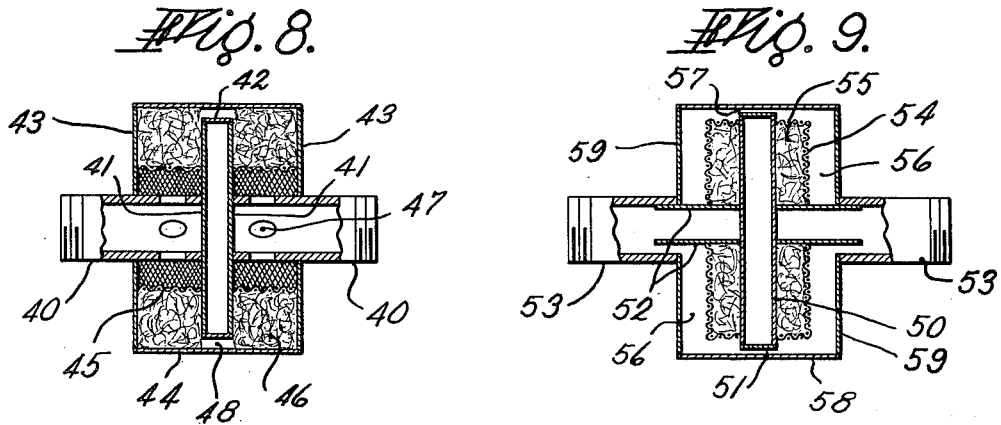
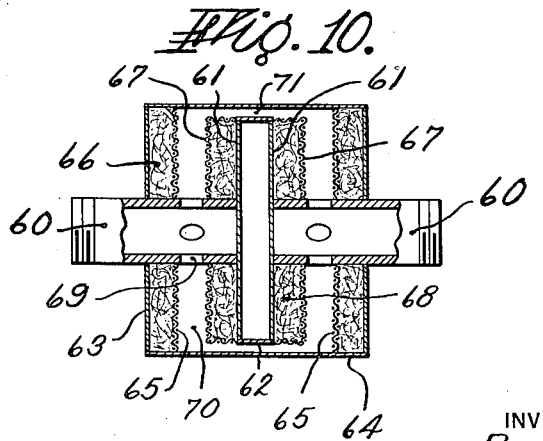
INVENTOR
ROLAND B. BOURNE
BY Chapin & Neal
ATTORNEYS Patented Mar. 4, 1941

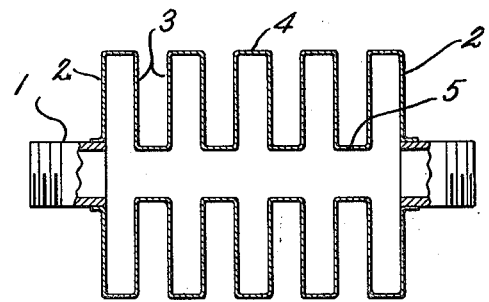
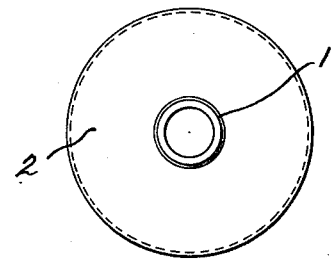
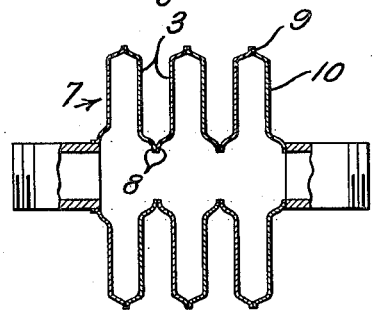
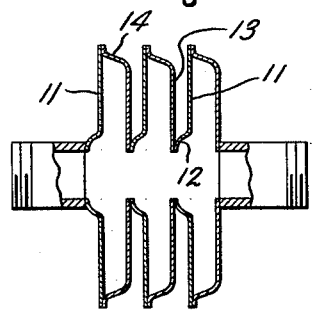
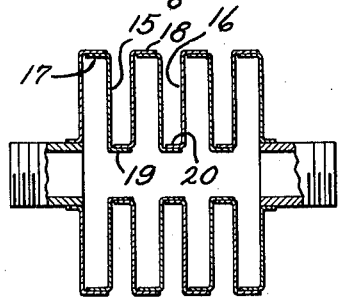
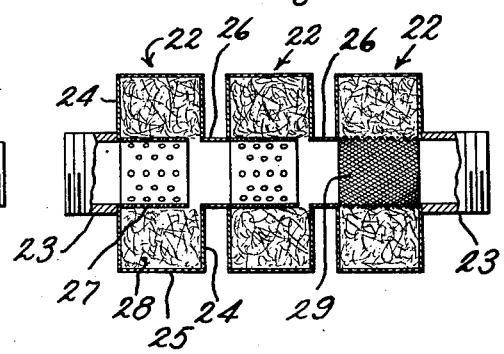

2,233,804

UNITED STATES PATENT OFFICE 2,233,804

FLUID SILENCER

Roland B. Bourne, West Hartford, Conn., assignor to The Maxim Silencer Company, Hartford, Conn., a corporation of Connecticut Application July 18, 1938, Serial No. 219,782

9 Claims. (Cl. 181—50)

The present invention relates to devices adapted to reduce the transmission of sound waves or similar vibrations along pipes and conduits and through the liquid carried thereby.

Such vibrations may result from many causes. In residences, disturbances of a vibratory character may be created in the water piping by faucets, valves, pumps, or other devices. However created, these disturbances travel along the material of the pipe or conduit and also through the liquid carried thereby. They may be transmitted by the piping to partitions or floors which act as sounding boards and cause audible sound waves in the air; or they may radiate into the air from the piping directly, especially at points where dead ends occur such as at other faucets. Thus water being drawn in a residence laundry in the basement may cause disturbing noises in remote parts of the house. Sudden closing of a faucet results in a powerful surge or impulse traveling throughout the piping system of a residence which may appear as audible sound at any point in the residence at which the conditions are favorable for radiation into the air. Similarly, vibrations of audible frequency caused by a pump in the oil heating system may travel along the pipe connecting the pump with an oil tank in the basement and be radiated therefrom into the open air.

The usual silencing means which are applied to the attenuation of waves of audible frequency occurring in a gaseous medium, such as the exhaust from an internal combustion motor, are not applicable to the present problem. The reason for this is found in the material being conveyed through the conduit. In the case of the exhaust from an internal combustion motor the disturbances are created in a gaseous medium which has a specific impedance widely different from that of the conduit through which it is conveyed. Reflection of the waves therefore occurs at the boundaries between the gaseous medium and the conduit which results in confining the waves mainly to the gaseous medium. In the case of waves of audible frequency occurring in a liquid this confinement of the waves to the liquid does not exist, as the specific impedance of the liquid is substantially the same as that of the conduit in which it is confined and the waves travel through one with practically the same facility that they do through the other. A silencing means of a construction entirely suitable for attenuation of sound waves in a gaseous medium would therefore be entirely unsuited for attenuation of similar waves in a liquid medium since the housing of the silencing device would pick up the waves from the liquid substantially without loss and would short circuit and render negligible any attentuation effective directly upon the liquid. A baffle plate of brass, for instance, immersed in water, offers practically no attenuation to sound waves in the water since they pass from the water to the brass and from the brass into the water on the other side due to the similarity of the specific acoustic impedances of these materials. The effect is similar to that occurring in optics when a transparent crystal is immersed in a liquid having the same index of refraction as the crystal.

In the silencing devices of the present invention it is therefore necesary to provide a construction which not only affords high attenuation for the waves travelling in the fluid medium, but also effectively limits the transmission of these sound waves in the casing of the silencing device. I have found that many of the principles applicable to the silencing of sound waves in a gaseous medium may be applied to the silencing of sound waves in a liquid medium provided that adequate means are employed for preventing the transmission of the waves in the casing containing the silencing means. In order to accomplish this result, however, it is necessary to design the casing of the silencing device so that no short circuiting through it occurs in the region in which the attenuation of the waves in the liquid medium occurs. Otherwise the attenuation offered to the waves in the liquid may be rendered nugatory by the short circuiting of these waves by the confining conduit. While in some instances this can be accomplished by making the casing of a material, such as rubber or a combiantion of rubber and fabric, through which sound waves will not readily pass, this construction is not generally suitable for permanent installations. In the preferred embodiments the casing is not only constructed so as to offer no free path for the waves in question but also is of the same durability as the remainder of the conduit in which the liquid is confined, and is preferably constructed of metal. In this case the prevention of the transmission of sound waves through the metallic walls of the casing is accomplished by the manner in which these walls are formed, as will be fully described below.

The invention will now be described with particular reference to the accompanying drawings, in which, Fig. 1 is a cross sectional view through one embodiment of the invention;

Fig. 2 is an end elevation of the device shown in Fig. 1;

Figs. 3, 4, and 5 are cross sectional views of modifications of the device shown in Fig. 1;

Fig. 6 is a cross sectional view of a further modification of the device shown in Fig. 1, in which the attenuation of the waves within the liquid contained in the conduit is in part accomplished of sound absorbing material;

Fig. 7 is a cross sectional view of a further modification in which the main path of the liquid lies through a body of sound absorbing material;

Fig. 8 is a cross sectional view of a further modification in which the casing is so constructed as to avoid the effect of expansion due to the pressure of the liquid;

Fig. 9 is a modification of the device shown in Fig. 8; and

Fig. 10 is a further modification of the device shown in Fig. 8.

In the device shown in Figs. 1 and 2 the main conduit 1 is interrupted by a device adapted to attenuate waves of audible frequency occurring within the conduit and at the same time to prevent the propagation of these waves through the material out of which the device is constructed. Attached to each end of the conduit is a disk 2 having a central aperture of the same size as the conduit, the connection between them being made in any suitable manner, as by bracing or clamping, so as to make it impervious to the passage of the liquid. Similar disks 3, having central openings preferably of the same size as the bore of the conduit, are interposed along the length of the attenuating device. The outer edges of the several disks are connected alternately by cylindrical members 4 and their inner edges by cylindrical members 5. The material of which the disks 2 and 3 are made is sufficiently flexible to materially or completely prevent the propagation of sound waves from one end of the device to the other. Since this effect is due to the fact that waves, in order to be propagated along the composite device, must be transmitted by lateral vibration in the disks whereas they pass by longitudinal vibration along the conduit itself, the reduction in thinness between the conduit and the disks need not be excessive if the disks are substantially plane, a conical or domed form increasing their rigidity to a point where material transmission would occur. In fact, it has been found by experiment that disks of fourteen gauge stock are quite effective in preventing the transmission of the vibrations in question.

The propagation of the vibrations along the material of the casing having thus been prevented, it remains to be seen how the vibrations in the liquid contained in the device are attenuated. In the embodiment under consideration this is obtained by the transmission losses caused by the change in cross-sectional area at each transition from a region of small cross-sectional area to one of large area or vice versa. This effect, occuring wholly within the liquid itself, is analogous to the general case of transmission through a conduit where abrupt changes in cross sectional area are encountered. As is well understood in the theory of acoustics, such abrupt changes introduce reflective losses which attenuate greatly, at each time that they occur, waves existing within the fluid which fill the conduit.

It should be noted that the device introduces losses in to the propagation of waves through the fluid medium and at the same time prevents the short circuiting of these waves through the conduit itself. It would be wholly ineffective to provide a device which should in theory attenuate waves occuring within the liquid and in series with it to provide means which would prevent the propagation of these waves through the conduit. It is necessary that the two effects occur simultaneously, for otherwise the portion of the device intended to dampen vibrations in the liquid would be short circuited by the conduit surrounding it;

and at the same time the non-propagating portion of the conduit would be short circuited by the liquid contained in it. In the construction described the two effects occur together, so that the waves at any one point find their opportunity for propagation through both the liquid and the conduit radically reduced. The same effect is obtained in the other modifications about to be considered. For the same reason the use of tie rods, or of any metallic parts rigidly joining one section with another, must be avoided.

Fig. 3 shows a constructional modification of the device shown in Fig. 1, in which the formation of the sections is somewhat simplified by the use of a series of identical stampings 7. These stampings are generally disk-like and plane, but have inwardly directed flanges 8 at their inner peripheries and outwardly directed flanges 9 at their outer peripheries. The adjacent flanges are secured to each other in any suitable means, as by brazing or clamping. In this form the radially directed portion 10 of the disks must be sufficiently plane to vibrate freely and thus prevent transmission of waves along it. If the disks approach a conical form except at their extremities they acquire a substantial rigidity which detracts greatly from their efficiency for the purpose here intended.

Fig. 4 shows a similar construction in which the disks are in two sets, the disks 11 of one set having portions 12 offset near their inner peripheries and the disks 13 of the other set having portions 14 offset near their outer peripheries. In this case the offset portion of one disk is brought into contact with a plane portion of the adjacent disk and secured in place as before.

Fig. 5 shows a similar construction in which the disks 15 and 16 are provided respectively with overlapping flanges 17 and 18 at their outer peripheries and with overlapping flanges 19 and 20 at their inner peripheries. This construction has advantages due to greater security in the joints by which one disk may be secured to the adjacent one.

In the devices thus far considered the attenuation of sound waves in the liquid medium has been accomplished purely by the introduction of transmission losses at points where the cross sectional area of the device abruptly changes. Since most of the sounds with which devices of this character are to deal are of high frequency it is useful to make use of the attenuating characteristics of sound absorbing material. Most of the usual materials of this type are not suitable for use in water, either on account of their tendency to disintegrate when wet or because they tend to deteriorate when in prolonged contact with water. I have found that bronze wool is quite satisfactory for this purpose. The devices now to be considered make use of this material in various manners.

Fig. 6 shows a silencing device comprising a plurality of chambers 22 interposed between the conduit sections 23, which are preferably formed with means such as screw threads so that they can be attached to the pipe line. Each chamber is formed by end members 24 of substantially plane disk-like form and apertured centrally to provide a passage for the liquid of substantially the same area as that of the conduit. The disks 24 are joined alternately by shells 25 and by nipples 26. Extending from one disk to a point near but spaced from the next is a perforated tube 27, the space between the tube and the shell 25 being filled with bronze wool 28. It is necessary to limit the length of the perforated tubes so that they do not entirely bridge the gap between adjacent disks in order to prevent acoustic short circuiting. The liquid fills the chambers as well as the central conduit, and the sound waves existing in the liquid are attenuated by the frictional effect of the bronze wool, which they can reach through the perforations in the tubes 27 and through the gaps between these tubes and the next section. The perforated tubes may be replaced by wire screening 29, as in the right hand section in Fig. 6, the wires forming the screening being preferably arranged diagonally. In this case the screening may entirely bridge the gap between adjacent nipples 26, since sound waves will not readily travel along the fine wires especially if the diagonal arrangement be used. In this form of the invention it should be noted that the sections are not formed by single baffle plates as would be possible for a silencer intended for use with a gaseous medium; but are entirely separate, each with its own end plates. This is for the reason that the sound waves would pass directly through such a single baffle plate due to the similarity of the specific acoustic impedances of the plate and the liquid as previously discussed.

Fig. 7 shows another similar embodiment in which the main path of the liquid is through the sound absorbing material. In the construction here shown the end nipples 30 and intermediate nipple 31 are turned down to receive the substantially plane disks 32, and are then spun outwardly as at 33 to engage the disks tightly. The outer circumferences of the disks are turned laterally as at 34, and cylindrical connecting members 35 have their ends spun around these flanges as at 36. Other methods of connection may be used if desired. The interior of the chambers thus formed is filled with bronze wool 37, which is held away from too close contact with the ends of the nipples by conical wire screens 38 secured to the inner surfaces of the disks.

All the devices thus far described will elongate slightly when the liquid is under pressure. In certain applications this may be a disadvantage. Fig. 8 shows a device which, while utilizing the principles of the forms previously described, is extremely rigid and will not change its length under pressure. It is also extremely efficient as a silencer. For simplicity one section only is shown in the drawings, but of course as many sections as desired may be used in series. It comprises two pipes 40 spaced axially apart and having brazed or otherwise secured to their ends substantially plane disks 41 joined at their outer circumferences by a cylindrical sleeve 42 to form an air-filled chamber. Disks 43 are secured in any suitable way to the pipes in spaced relation to the disks 41, and are of somewhat greater diameter so that they can be bridged by a sleeve 44 which passes freely outside the sleeve 42. Cylindrical wire screens 45 extend between each pair of the disks 41, 43, the annular spaces thus formed being filled with bronze wool 46. The pipes are perforated at 47 to permit the passage of the liquid. The portions of the pipes beyond these perforations serve merely as supports for the disks 41, and may be replaced by other forms of supporting means, as in Fig. 9, which permit the flow of liquid outwardly between disks 41 and 43.

In this form of silencer the liquid passes through one pipe 40, out through the holes 47, through one annulus of bronze wool, through the annular space 48 left between the sleeves 42 and 44, through the second annulus of bronze wool, and out through the second pipe. Attenuation of sound waves in the liquid is secured mainly through the sound absorbing action of the bronze wool, although transmission losses are also introduced due to changes in area and direction. Transmission of sound waves through the casing is prevented by the avoidance of any through path that does not involve plane disk-like members. As in the preceding cases, the use of a single diaphragm rather than the two air-separated disks 41 would result in by-passing sound waves from one chamber to the other through the diaphragm on account of the substantial identity of specific acoustic impedances.

As previously stated, this form of device does not change length if the liquid is under pressure. The pressure on the gas filled partition tends to collapse it, this being resisted by the attachment of each disk 41 to the pipe 40. The pressure on each disk 41 is thus transmitted to its pipe 40, and is substantially balanced by the pressure on the disk 43 attached to the same pipe. There is thus a stress tending to separate the two disks on each pipe, which is amply strong enough to resist it. The slight unbalance due to the difference in areas of the disks 41 and 43 is not great enough to cause any material elongation when the device is under pressure.

Fig. 9 shows a similar form of device, in which the central hollow air-filled partition, composed of the disks 50 and the sleeve 51, is supported on posts 52 extending from the end pipes 53. The screen 54 in this case extends so as to form a chamber at the side of each disk 50, in which bronze wool 55 is packed. In this case the fluid passes through one radial passage 56, through the annular passage 57 between the sleeve 51 and the cylinder 58 which is carried by the disks 59, and back through the second radial passage 56. The functioning of this form of device is the same as that shown in Fig. 8 except that instead of the liquid passing through the sound absorbing material it passes through radial and annular passages lined on one side with bronze wool.

Fig. 10 shows another form of device which is quite similar to the last two. The main conduit sections 60 have attached to their ends a pair of spaced disks 61 joined by a sleeve 62 to form an air-filled chamber, and a pair of disks 63 of larger diameter joined by a sleeve 64. Wire screens 65 attached to the latter sleeve and to the sections 60 in spaced relation to the two disks 63 form a chamber which may be packed with bronze wool 66. A screen 67 attached to each of the disks 61 and to the sections 60 forms chambers which are packed with bronze wool 68. The liquid passes through one of the conduit sections 60, through holes 69 therein, through a radial channel 70 formed between the screens 65 and 67, through an annular channel 71 between the sleeves 62 and 64, and back to the other conduit section through similar passages. The silencing is accomplished mainly by the linings of bronze wool placed adjacent the passages, and to some extent by the introduction of reflective losses. Prevention of elongation is accomplished as in the structure shown in Fig. 8.

I claim:

1. A sound attenuating device for pipe borne liquids comprising spaced conduit sections, a casing enclosing the space between the sections and having substantially plane end walls sufficiently flexible to prevent substantial transmission of sound through them, and a baffle interposed within the casing in the space between the sections comprising a hollow gas filled partition.

2. A sound attenuating device for pipe borne liquids comprising spaced conduit sections, a casing enclosing the space between the sections and having substantially plane end walls sufficiently flexible to prevent substantial transmission of sound through them, and secured to the conduit sections, and a hollow gas filled partition interposed between the conduit sections and spaced from the casing to provide a liquid passageway between the partition and the casing, the partition being formed with parallel substantially plane walls each supported from one of the spaced conduit sections to permit liquid flow between the partition and the casing.

3. A sound attenuating device for pipe borne liquids comprising spaced conduit sections, a casing enclosing the space between the sections and having substantially plane end walls sufficiently flexible to prevent substantial transmission of sound through them and secured to the conduit sections, a hollow gas filled partition interposed between the conduit sections and spaced from the casing to produce a liquid passageway between the partition and the casing, the partition being formed with parallel substantially plane walls each supported from one of the spaced conduit sections to permit liquid flow between the partition and the casing, and sound absorbing material located in the passageway between the partition and the casing.

4. A sound attenuating device for pipe borne liquids comprising spaced conduit sections and two casings positioned one within the other to form a liquid receiving chamber between them, each casing having at least a portion of its walls substantially non-conductive to sound in a direction along the extent of said wall portion, said outer casing being secured to and opening into said conduit sections, said inner casing having its walls exposed to liquid on their outer sides and to air on their inner sides.

5. A sound attenuating device for pipe borne liquids comprising inlet and outlet conduits, a succession of liquid containing chambers located between and connected to said conduits, each bounded by a pair of end walls and a wall bridging the outer peripheries of said end walls, each end wall being substantially plane and sufficiently flexible to prevent substantial transmission of sound waves through it in the direction of its maximum extent, each chamber so bounded having an effective area normal to the direction of flow substantially greater than that of the conduits, and a passage connecting each pair of chambers and having an effective area substantially that of the conduits; the change in cross-sectional area between the passages and chambers being sufficiently large to cause transmission losses of sound waves by reflection of sound waves in the liquid.

6. A sound attenuating device for pipe borne liquids comprising inlet and outlet conduits, a succession of liquid containing chambers located between and connected to said conduits, each bounded by a pair of end walls and a wall bridging the outer peripheries of said end walls, each end wall being substantially plane and sufficiently flexible to prevent substantial transmission of sound waves through it in the direction of its maximum extent, each chamber so bounded having an effective area normal to the direction of flow substantially greater than that of the conduits, and a passage connecting each pair of chambers and having an effective area substantially that of the conduits; the change in cross-sectional area between the passages and chambers being sufficiently large to cause transmission losses of sound waves by reflection of sound waves in the liquid, and sound absorbing material located within said chambers.

7. In an attenuating device for pipe borne liquids, a liquid carrying conduit having spaced sections, and a baffle interposed between the sections of the conduit and comprising substantially parallel end walls connected in fluid tight relation to form a closed, fluid-tight chamber, the end walls of said chamber being each secured to a section of the conduit and being sufficiently flexible to prevent substantial radial transmission of sound waves therein, and material contained in the space within the chamber having a specific acoustic impedance substantially different from that of the liquid.

8. A sound attenuating device for pipe borne liquids comprising inlet and outlet conduits, a succession of annular wall members interposed between said conduits and alternately connected at their inner and outer peripheries to form a succession of liquid containing chambers, opposite end wall members of the succession being connected one to each of the conduits, each wall member being substantially plane and sufficiently flexible to prevent substantial radial transmission of sound waves therein, each of said chambers having an effective area normal to the direction of flow substantially greater than that of the conduits and the passages formed by the connections between the inner peripheries of the chambers having an effective area substantially equal to that of the conduits; the change in cross-sectional area between the passages and chambers being sufficiently large to cause transmission losses of sound waves by reflection of said sound waves in the liquid.

9. A sound attenuating device for pipe borne liquids comprising inlet and outlet conduits, a succession of annular wall members interposed between said conduits and alternately connected at their inner and outer peripheries to form a succession of liquid containing chambers, opposite end wall members of the succession being connected one to each of the conduits, each wall member being substantially plane and sufficiently flexible to prevent substantial radial transmission of sound waves therein, each of said chambers having an effective area normal to the direction of flow substantially greater than that of the conduits and the passages formed by the connections between the inner peripheries of the chambers having an effective area substantially equal to that of the conduits; the change in cross-sectional area between the passages and chambers being sufficiently large to cause transmission losses of sound waves by reflection of said sound waves in the liquid; and a hollow baffle interposed in at least one of said chambers comprising substantially parallel end walls connected in fluid-tight relation to form a closed, fluid-tight chamber, the end walls of said baffle chamber being sufficiently flexible to prevent substantial radial transmission of sound waves therein, and material contained in the space within said baffle chamber having a specific acoustic impedance substantially different from that of the liquid.

ROLAND B. BOURNE.